May 23, 1939.　　　　J. C. McCUNE　　　　2,159,815
COMPRESSOR LUBRICATING DEVICE
Filed March 27, 1937
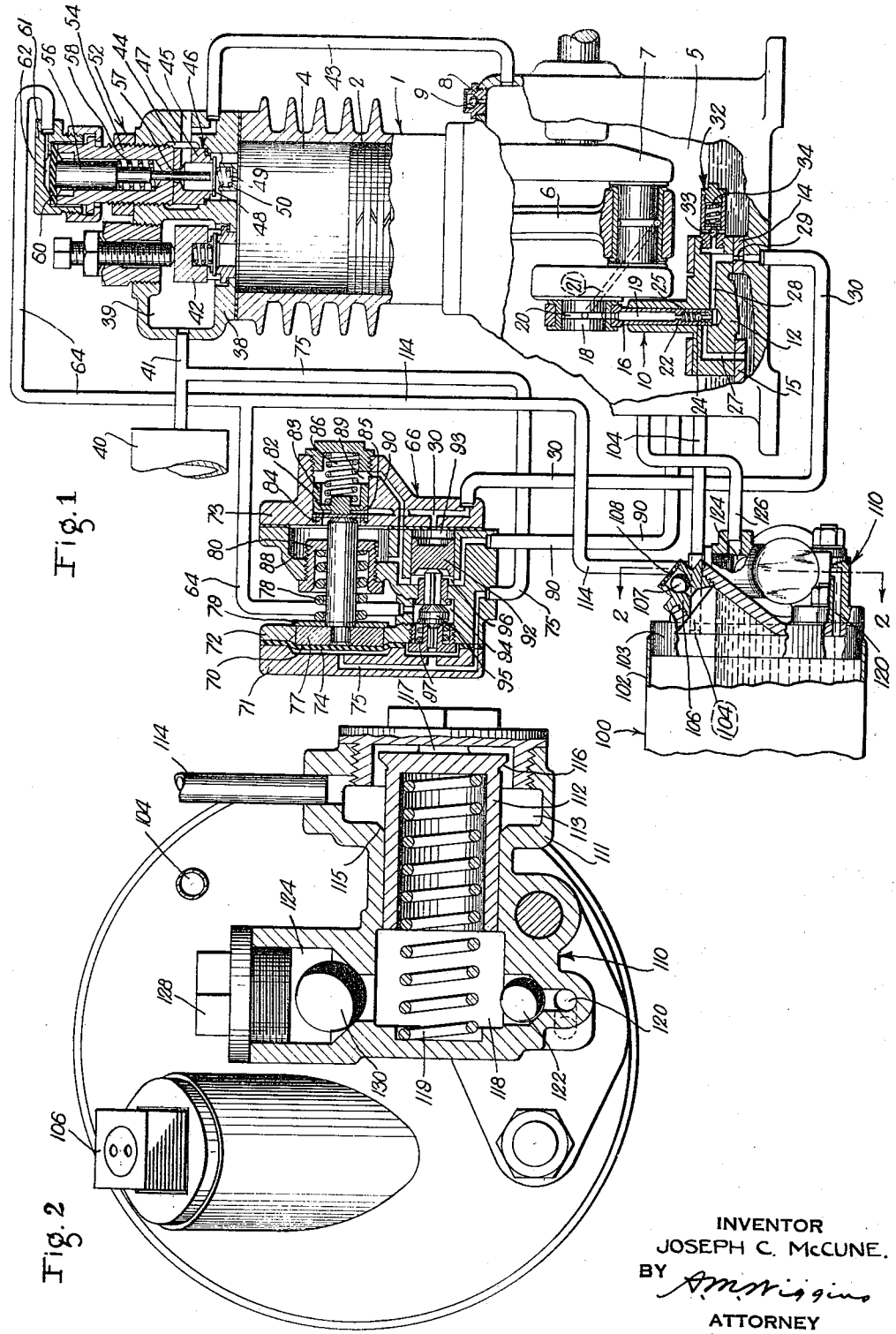
INVENTOR
JOSEPH C. McCUNE.
BY A. M. Wiggins
ATTORNEY Patented May 23, 1939

2,159,815

UNITED STATES PATENT OFFICE 2,159,815

COMPRESSOR LUBRICATING DEVICE

Joseph C. McCune, Edgewood, Pa., assignor to The Westinghouse Air Brake Company, Wilmerding, Pa., a corporation of Pennsylvania Application March 27, 1937, Serial No. 133,368

3 Claims. (Cl. 230—206)

This invention relates to a fluid compressor and particularly to improved means to maintain the supply of lubricant in the compressor lubricating system.

As usually constructed fluid compressors have crankcase chambers adapted to hold a quantity of lubricant. In some types of compressors the capacity of the crankcase chamber is relatively small, and the chamber will not hold sufficient lubricant to permit the compressor to be operated for extended periods of time without the addition of lubricant to replace that consumed during operation of the compressor.

It is an object of this invention to provide a supplementary lubricant reservoir adapted for use with a compressor, together with means for automatically supplying lubricant from this reservoir to the compressor crankcase chamber to maintain the lubricant in the compressor crankcase chamber substantially at a predetermined level.

A further object of the invention is to provide a supplementary lubricant source, together with means responsive to an operating condition of a fluid compressor for supplying lubricant from this source to the crankcase chamber of the compressor.

Another object of the invention is to provide a supplementary lubricant reservoir adapted to be employed with a fluid compressor, and automatic means for supplying lubricant from this reservoir to the crankcase chamber of the compressor, together with means to return lubricant from the crankcase chamber to the reservoir in the event of an oversupply of lubricant to the compressor crankcase chamber.

A further object of the invention is to provide lubricant supply means adapted to be employed with a fluid compressor having associated therewith unloading means and a control device responsive to an operating condition of the compressor for controlling the unloading means, the lubricant supply means having means controlled by the control device for supplying lubricant from a supplementary lubricant source to the compressor crankcase chamber.

Another object of the invention is to provide an improved compressor lubricating system.

A further object of the invention is to provide a lubricant supply means adapted to be employed with a fluid compressor of the type having a crankcase chamber adapted to contain a quantity of lubricant, the lubricant supply means comprising a reservoir adapted to contain a quantity of lubricant and automatic means for supplying lubricant from this reservoir to the compressor crankcase chamber to maintain the level of the lubricant in the crankcase chamber substantially at a predetermined level.

Another object of the invention is to provide lubricant supply means for a compressor of the type having a pressure lubricating system, the supply means comprising a supplementary lubricant reservoir and means responsive to the pressure of the lubricant in the compressor lubricating system for supplying lubricant from the reservoir to the compressor crankcase chamber.

Other objects of the invention and features of novelty will be apparent from the following description taken in connection with the accompanying drawing, in which Fig. 1 is a diagrammatic view, largely in section, of a fluid compressor equipped with the improved lubricating system provided by this invention, and Fig. 2 is an enlarged sectional view taken substantially along the line 2—2 of Fig. 1.

Referring to the drawing there is illustrated in Fig. 1 a fluid compressor 1 which may be of any suitable well known construction. This compressor comprises a body having a bore therein in which is mounted a piston 2 having a compression chamber 4 at the upper face thereof. The body of the compressor 1 has a crankcase chamber 5 formed therein, while a crankshaft 7 for reciprocating the piston 2 is mounted in this chamber. The crankcase chamber 5 is adapted to hold a quantity of lubricant to lubricate the operating portions of the compressor, while lubricant is supplied to the crankcase chamber through a suitable filler opening, not shown.

The crankcase chamber 5 is substantially sealed, and is connected to the atmosphere through a passage in a plug 8, while this passage is controlled by means of a ball check valve 9 which operates to permit fluid to escape from the crank case chamber 5 to the atmosphere and to prevent flow of fluid from the atmosphere to the crank case chamber.

The compressor 1 has associated therewith a lubricant pump 10 for supplying lubricant under pressure to portions of the compressor. This pump is mounted in the crank case chamber 5 and comprises a body 12 which is pivotally supported by brackets 14 and 15, which are secured to the bottom wall of the crank case chamber. The body 12 has a bore therein in which is reciprocable a plunger 16 which is mounted on an eccentric 18 formed on the crankshaft 7. The plunger 16 has a passage 19 extending therethrough and communicating with an annular groove 20 in the face of the eccentric 18. The groove 20 is connected by means of a passage 21 with a groove in the face of the bearing surface on the crankshaft on which is mounted the connecting rod 6 for reciprocating the piston 2.

The passage 19 has a choke 22 interposed therein, while a ball chack valve 24 is yieldingly pressed by a spring 25 against a seat surrounding the end of the passage 19 to permit lubricant to flow from the bore in the body 12 to the passage 19, and to prevent back flow of lubricant from the passage 19.

At one point in its range of movement the end of the plunger 16 is located above a passage 27, which leads from the lower portion of the crankcase chamber 5 to the bore in the body 12, to permit lubricant to flow from the crankcase chamber to the bore in the body 12, while at another point in its range of movement the plunger 16 cuts off communication through this passage.

A passage 28 communicates with the bore in the body 12 at a point adjacent the end thereof, and communicates through a choke 29 with a pipe 30 leading to a control device associated with the compressor. A pressure release device 32 is provided to control the pressure of the lubricant in the passage 28. This device comprises a ball valve 33 which is normally held in the seated position by a spring 34 to prevent the release of lubricant from the passage 28, while this valve is unseated on a predetermined increase in the pressure of the lubricant in the passage 28 to release lubricant therefrom and thus reduce the pressure therein.

The compressor 1 has a removable cylinder head 38 in which is formed an exhaust chamber 39 which is constantly connected with a reservoir 40 by way of a pipe 41. The exhaust chamber 39 has mounted therein an exhaust valve assembly 42 which may be of any well known construction, and operates to permit fluid to flow from the compression chamber 4 to the exhaust chamber 39 and thence to the reservoir 40, and to prevent back flow of fluid from the reservoir 40 and the exhaust chamber 39 to the compression chamber 4.

The head 38 of the compressor 1 also has formed therein an inlet chamber 44 which is constantly connected to the atmosphere by way of a passage 45, while an inlet valve assembly 46 is mounted in this chamber. As shown the inlet valve assembly 46 comprises a seat member 47 having an annular seat rib formed thereon which is adapted to be engaged by a disc valve 48. The valve 48 is yieldingly pressed into engagement with the seat member 47 by a coil spring 49 which extends between the valve 48 and a spring cage 50.

A pipe 43 is provided and connects the crank case chamber 5 with a passage in the cylinder head 38 which is open to the inlet passage 45.

The inlet valve assembly 46 has associated therewith unloading means indicated generally by the reference numeral 52. The unloading means 52 comprises a body 54 which is secured in the cylinder head 38 and serves to maintain the seat member 47 in position in the inlet chamber 44. The body 54 has a bore therein in which is mounted a plunger 56 having a stem 57 which is adapted to engage the valve 48 to move the valve away from its seat on the seat member 47. A coil spring 58 is mounted in the bore in the body 54 and yieldingly urges the plunger 56 upwardly so that the end of the stem 57 is spaced from the valve 48, thereby permitting the spring 49 to hold the valve 48 in engagement with the seat member 47.

The upper end of the plunger 56 engages one face of a flexible diaphragm 60 which is clamped between the body 54 and a cap member 61. The diaphragm 60 has at the other face thereof a chamber 62 which is connected by way of a pipe 64 with a control device indicated generally with the reference numeral 66.

The unloading control device 66 may be of any suitable well known construction and the device employed with the compressor shown in this application is shown and claimed in U. S. Patent No. 2,065,204, to Burton S. Aikman. This device comprises a flexible diaphragm 70 which is clamped between the body sections 71 and 72 and has at one face a chamber 74 which is constantly connected by way of a passage and pipe 75 with the reservoir 40. The other face of the diaphragm 70 is engaged by a plunger 77 having a stem on which is mounted a coil spring 78 and a plate 79. The spring 78 extends between the plate 79 and an adjustable spring seat 80, while movement of the plunger and the diaphragm by the spring is limited by engagement of the plate 79 with the face of the body section 72.

The control device 66 includes a body section 73 having a bore therein in which is mounted a disc valve 82 and a plunger 83. The valve 82 is yieldingly pressed against the seat rib 84 by means of a coil spring 86 operating through the plunger 83. The area within the seat rib 84 is open to a chamber 88 formed by the body sections 72 and 73, while this chamber and the chamber 89 at the spring side of the plunger 83 are connected by way of a passage 90 with a bore in the body section 72, and thence by way of a passage and pipe 96 to the crankcase chamber 5 of the compressor 1.

The body section 72 has a bore therein in which is mounted a piston 92 having at one face thereof a chamber 93 to which is connected a branch of the passage 30 to which is connected the pipe 30 leading from the compressor lubricant pump 10, while another branch of the passage 30 communicates with the chamber 85 in the body section 73 between the disc valve 82 and the plunger 83.

The body section 72 also has a chamber 94 therein to which is connected the pipe 64 leading to the compressor unloading means 52, and in which is mounted a double beat valve 95. This valve has a fluted stem mounted in a bore which is supplied with fluid under pressure from the passage 75, which is connected to the reservoir 40, while the valve 95 has a seating face thereon adapted to engage a seat surrounding this bore to cut off the supply of fluid under pressure from the passage 75 to the chamber 94 and thence to the pipe 64 leading to the compressor unloading means 52.

The valve 95 also has a fluted stem mounted in a bore extending between the chamber 94 and the chamber 96 at the face of the piston 92, which chamber is open to the atmosphere through the passage and pipe 90 and the compressor crankcase chamber 5. The valve 95 is yieldingly urged to the right, as viewed in the drawing, by a coil spring 97, while an end of the stem of the valve is engaged by the piston 92 so that the piston may move the valve against the spring 97.

In operation, assuming that fluid under pressure is present in the reservoir 40 at a value less than a predetermined value, and that the compressor 1 is idle so that no pressure is exerted by the pump 10 on the lubricant in the compressor lubricating system, the spring 97 holds the valve 95 in the position to prevent the release of fluid from the chamber 94 to the chamber 96, and to permit the supply of fluid from the passage 75 to the chamber 94 and thence by way of the pipe 64 to the chamber 62 of the compressor unloading means 52. Fluid under pressure in the chamber 62 exerts force through the diaphragm 60 to hold the plunger 56 against the spring 58 so that the end of the stem of the plunger 56 holds the inlet valve 48 against the spring 49 away from its seat to thereby unload the compressor.

Upon rotation of the compressor crankshaft 7 the piston 2 is reciprocated, and on the downward strokes of the piston fluid from the atmosphere is drawn into the compression chamber 4 through the inlet passage 45, while this fluid is forced out from the compression chamber 4 to the atmosphere past the open inlet valve 48 on the upward strokes of the piston 2.

Upon rotation of the crankshaft 7 the plunger 16 of the lubricant pump 10 is reciprocated in the bore in the body 12, and on its upward strokes causes lubricant to be drawn into this bore from the crankcase chamber 5 through the passage 27, and on its downward strokes the plunger 16 subjects this lubricant to pressure so that lubricant flows past the ball check valve 24 to the passage 19, and thence to the groove 20 in the eccentric 18, from which lubricant flows through the passage 21 in the crank shaft 7 to the bearing for the connecting rod 6.

Lubricant under pressure is also supplied to the passage 28 from which lubricant flows through the choke 29 to the pipe 30 leading to the control device 66, while if the pressure of the lubricant in the passage 28 exceeds a predetermined value the ball valve 33 is unseated to release lubricant from the passage 28 and thus reduce the pressure on the lubricant therein.

Lubricant under pressure supplied to the pipe 30 flows to the chamber 93 at the face of the piston 92 of the control device 66, and to the chamber 85 between the valve 82 and the plunger 83. The pressure of the lubricant supplied by the pump 10 varies in accordance with the speed at which the pump is operated, and on an increase in the speed of the compressor crank shaft 7 to a predetermined value, the pressure of the lubricant supplied by the pump 10 to the pipe 30 exerts sufficient force on the piston 92 to the move the piston and the valve 95 against the coil spring 97, while the lubricant supplied to the chamber 85 moves the plunger 83 against the spring 86 away from the valve 82, and also exerts force on the valve 82 to press it against the seat rib 84.

The valve 95 is moved by the piston 92 to cut off the supply of fluid under pressure from the passage 75 to the chamber 94 and to the pipe 64 leading to the compressor unloading means 52, and to open communication from the chamber 94 to the chamber 96 so that fluid under pressure is released from the compressor unloading means 52 to the atmosphere by way of the pipe 64, the chambers 94 and 96, passage and pipe 90 and the compressor crankcase chamber 5.

On this reduction in the pressure of the fluid in the chamber 62 of the unloading means 52, the plunger 56 is moved upwardly by the spring 58 so that the stem 57 is moved away from the inlet valve 48 to permit the inlet valve to be moved to the seated position by the spring 49 to load the compressor.

On continued operation of the compressor, fluid is drawn into the compression chamber 4 from the atmosphere through the inlet passage 45 and chamber 44, and past the inlet valve 48 on the downward strokes of the piston 2, and on upward strokes of this piston, the inlet valve 48 is moved to the seated position by the spring 49, while the fluid in the compression chamber 4 is compressed past the exhaust valve 42 to the reservoir 40 to increase the pressure of the fluid therein.

When fluid is drawn into the inlet chamber 44 through the passage 45 there is a reduction in the pressure of the fluid in the inlet passage 45 and fluid flows to the inlet passage from the crankcase chamber 5 through the pipe 43, thereby reducing the pressure in the crankcase chamber 5 to a value somewhat below the pressure of the atmosphere. The ball check valve 9 operates at this time to prevent the flow of fluid from the atmosphere to the crankcase chamber 5 through the passage in the plug 8. As the crankcase chamber 5 is maintained at a pressure somewhat below atmosphere, fluid from the atmosphere tends to flow to the crankcase chamber through the joints in the casing sections of which the crankcase chamber is constructed and thereby tends to prevent leakage of lubricant from the crankcase chamber through these joints.

As a result of operation of the compressor 1 there is an increase in the pressure of the fluid in the reservoir 40, and a corresponding increase in the pressure of the fluid in the chamber 74 at the face of the flexible diaphragm 70 of the control device 66. On an increase in the pressure of the fluid in the chamber 74 force is exerted through the diaphragm 70 to move the plunger 77 against the spring 78, and after a slight movement of this plunger against the spring, the end of the plunger engages a face of the disc valve 82 so that further movement of the plunger is resisted by the lubricant under pressure in the chamber 85 at the face of the disc valve 82. When the pressure of the fluid in the reservoir 40, and in the chamber 74, has increased to a predetermined relatively high value, the force exerted thereby is sufficient to overcome the opposing force of the spring 78 and of the lubricant under pressure operating against the disc valve 82, and the plunger 77 is thereupon moved to the right, as viewed in the drawing, and moves the disc valve 82 away from the seat rib 84 to open a communication through which lubricant supplied to the chamber 85 by way of the passage 30 may escape at a rapid rate to the chamber 88, and thence by way of the passage and pipe 90 to the crank case chamber 5 of the compressor.

As a result of the release of lubricant under pressure from the chamber 30 there is a rapid reduction in the pressure exerted thereon as lubricant is supplied to this passage only at a restricted rate by the pump 10 through the choke 29, and on this reduction in the pressure on the lubricant in the passage 30 there is a corresponding reduction in the pressure on the lubricant in the chamber 93 at the face of the piston 92. The force exerted by the lubricant on the piston 92 will then be insufficient to maintain the piston and the valve 95 against the opposing force of the spring 97 with the result that the valve 95 and the piston 92 are moved to the right, as viewed in the drawing, by the spring 97. On this movement of the valve 95 communication between the chamber 94 and the chamber 96 is cut off, while fluid under pressure flows from the passage 75 to the chamber 94, and thence by way of the pipe 64 to the chamber 62 of the compressor unloading means 52.

On an increase in the pressure of the fluid in the chamber 62 the plunger 56 is moved downwardly against the spring 58 to again unload the compressor as explained in detail above.

When the disc valve 82 of the control device 66 is moved away from the seat rib 84 and lubricant is released from the chamber 85 at the face of this disc valve, there is a reduction in the force exerted on the plunger 77 and opposing movement of this plunger by the fluid under pressure in the chamber 74. The plunger 77, therefore, will remain in the position to hold the disc valve 82 away from the seat rib 84 until the pressure of the fluid in the chamber 74, and in the reservoir 40, is reduced to a value somewhat below that required to initially move the plunger 77 against the combined forces of the spring 78 and of the lubricant operating on the valve 82.

On the reduction in the pressure on the lubricant in the chamber 85, the plunger 83 is moved by the spring 86 to press the disc valve 82 against the end of the stem of the plunger 77. The spring 86 is relatively weak, however, and the force exerted on the plunger 77 is negligible in amount.

At this time, as the compressor continues to be operated, the lubricant pump 10 continues to exert pressure on the lubricant in the compressor lubricating system, while lubricant is supplied at a restricted rate through the choke 29 to the pipe 30. However, as lubricant may escape from the passage 30 in the control device 66, past the disc valve 82 at a much more rapid rate than lubricant is supplied through the choke 29, no pressure will be developed in the chamber 93 of the control device 66, and the valve 95 will remain in the position to which it has been moved by the spring 97.

On a reduction in the pressure of the fluid in the reservoir 40 to a predetermined relatively low value, the force exerted by fluid under pressure in the chamber 74 is insufficient to maintain the plunger 77 against the opposing force of the spring 78, and the plunger 77 is thereupon moved to a position to permit the spring 86, operating through the plunger 83 to move the disc valve 82 to the seated position to cut off the release of lubricant from the chamber 85 to the chamber 88. On the continued supply of lubricant by the lubricant pump 10 to the pipe 30 there is an increase in the pressure of the lubricant in the pipe and passage 30, and a similar increase in the pressure of the lubricant in the chamber 93 at the face of the piston 92, while force is exerted by this lubricant on the disc valve 82 to maintain it in the seated position and to move the plunger 83 against the spring 86.

On this increase in the pressure of the lubricant in the chamber 93, the piston 92 is moved to the left, as viewed in the drawing, and moves the valve 95 against the spring 97 to cut off the supply of fluid under pressure from the passage 75 to the chamber 94 and thence to the compressor unloading means 52 by way of the pipe 64, and to release fluid from the chamber 94 and from the compressor unloading means 52 to again effect loading of the compressor, as explained in detail above, so that on continued operation of the compressor, fluid is compressed into the reservoir 40 to increase the pressure of the fluid therein.

The control device 66 also operates to automatically unload the compressor when the compressor ceases to be operated, or in the event of failure of the compressor lubricating system. When the compressor is no longer operated, the lubricant pump 10 does not supply lubricant under pressure to the pipe 30, and, similarly, if the lubricating system of the compressor fails to function properly, lubricant at the proper pressure will not be supplied to the pipe 30. On a reduction in the pressure of the lubricant supplied to the pipe 30 for any reason, there is a corresponding reduction in the pressure of the lubricant in the chamber 93 at the face of the piston 92, and the force exerted by this lubricant on the piston 92 is insufficient to maintain the piston and the valve 95 against the opposing force of the spring 97, which thereupon moves the valve 95 to a position to cut off communication between the chamber 94 and the chamber 96, and to permit fluid under pressure supplied from the reservoir 40 to the passage 75 to flow to the chamber 94, and thence by way of the pipe 64 to the unloading means 52 for the compressor to unload the compressor.

The lubricant supply system provided by this invention includes a supplementary lubricant reservoir 100 which, as shown, comprises a tubular shell 102 having one end closed by means of a head 103.

The reservoir 100 may be located adjacent the compressor 1 or at a point spaced from the compressor, but is mounted vertically below the crankcase chamber 5 of the compressor. A pipe 104 communicates with the upper portion of the reservoir 100 and with the compressor crankcase chamber 5 substantially at the level at which it is desired to maintain the lubricant in the crankcase chamber. If the level of the lubricant in the crankcase chamber rises above the desired level, lubricant will flow by gravity from the crankcase chamber 5 through the pipe 104 to the reservoir 100 to reduce the lubricant in the crankcase chamber 5 to the desired level.

The head 103 has a filler opening formed therein and communicating with the upper portion of the reservoir 100. This opening is closed by means of a threaded plug 106 having a chamber therein in which is mounted a ball valve 107 which is held within the chamber by means of a perforated retainer 108. The ball valve 107 is adapted to seat upon a seat surrounding a passage through the plug 106 and operates to permit fluid to escape from the upper portion of the reservoir 100 to the atmosphere and thereby prevent a build up of pressure in the reservoir, while the ball valve 107 also serves to prevent the flow of fluid from the atmosphere to the reservoir 100, and thence by way of the pipe 104 to the compressor crankcase chamber 5 on a reduction in the pressure of the fluid in the crankcase chamber to a value below atmospheric pressure.

The head 103 has associated therewith supply means 110 for supplying lubricant from the reservoir 100 to the crankcase chamber 5, and, as shown, this means comprises a body 111 having a bore therein in which is mounted a hollow piston 112 having at one face a chamber 113 which is constantly connected by way of a pipe 114 with the pipe 64 connecting the unloading control device 66 and the unloading means 52. The end of the bore in the body 111 adjacent the chamber 113 is surrounded by a seat indicated at 115 and adapted at certain times, as will hereinafter more fully appear, to be engaged by a complementary seat 116 formed on the piston 112 to prevent leakage of fluid from the chamber 113 through the bore in the body 111.

The piston 112 has at the other face thereof a chamber 118 in which is mounted a coil spring 119, which extends between a wall of the chamber 118 and the face of the piston 112 and yieldingly urges the piston 112 to the right, as viewed in Fig. 2 of the drawing, until a projection 117 on the piston engages a wall of the chamber 118 to prevent further movement of the piston.

The chamber 118 is connected with the lower portion of the reservoir 100 by way of a passage 120, while a ball check valve 122 is provided and operates to permit the supply of lubricant from the reservoir to the chamber 118, and to prevent back flow of lubricant from the chamber 118 to the reservoir.

The body 111 has formed therein a chamber 124 which is constantly connected by way of a pipe 126 with the crankcase chamber 5 of the compressor 1. One side of the chamber 124 is closed by means of a threaded plug 128, while a ball check valve 130 is mounted in the chamber 124 and operates to permit lubricant to be supplied from the chamber 118 to the chamber 124 and thence by way of the pipe 126 to the crankcase chamber 5, and to prevent back flow of lubricant from the crankcase chamber 5 and the pipe 126 to the chamber 118.

In the operation of this lubricant supply system lubricant is initially supplied to the compressor crankcase chamber 5 and to the reservoir 100 to fill the crankcase chamber 5 to the desired level, and to fill the reservoir 100 substantially to the level permitted by the filler plug 106. If the level of the lubricant in the crankcase chamber 5 is raised too far, excess lubricant will flow from the crankcase chamber by way of the pipe 104 to the reservoir 100 to reduce the lubricant in the crankcase chamber 5 to the desired level.

On the supply of lubricant to the reservoir 100 lubricant flows therefrom by way of the passage 120, unseats the ball check valve 122, and flows to the chamber 118 to fill this chamber with lubricant, while the air which is displaced flows past the ball check valve 130 to the chamber 124 and thence by way of the pipe 126 to the crankcase chamber 5 from which it may escape to the atmosphere.

At this time, assuming that the compressor is idle, the control device 66 operates to supply fluid under pressure to the pipe 64 with the result that the chamber 62 of the compressor unloading means 52, and the chamber 113 of the lubricant supply means 110 are maintained substantially at reservoir pressure.

As the chamber 62 of the unloading means 52 is at reservoir pressure, the plunger 56 is maintained in the position in which the stem 27 holds the inlet valve 48 away from its seat against the spring 49 and thereby unloads the compressor 1, as explained above.

As the chamber 113 of the lubricant supply means 110 is at atmospheric pressure the piston 112 is held against the spring 119 in the position in which the seat 116 thereon engages the seat 115 on the body 111 to prevent leakage of fluid from the chamber 113.

When the compressor crankshaft 7 is rotated, the piston 2 is reciprocated in the bore in which it is mounted and the fluid which is drawn into the compression chamber 4 on the downward strokes of the piston is forced out past the open inlet valve 48 on the upward strokes of the piston. In addition, upon rotation of the compressor crankshaft 7, the lubricant pump 10 draws lubricant from the lower portion of the crankcase chamber 5 and supplies it under pressure to the portions of the compressor to be lubricated, and also supplies lubricant under pressure to the pipe 30 leading to the control device 66.

When the speed of the compressor has increased to a predetermined value, the pressure exerted by the lubricant pump 10 on the lubricant supplied thereby to the control device 66 is high enough to cause the piston 92 to be moved against the spring 97 so that the valve 95 is moved to a position to cut off the supply of fluid under pressure from the pipe and passage 75 to the chamber 94, and thence to the pipe 64 leading to the compressor unloading means 52, and to the chamber 113 of the lubricant supply means 110, while the valve 95 is moved to a position to release fluid from the chamber 94. Upon the release of fluid from the chamber 94, fluid is released from the pipe 64 leading from the compressor unloading means 52 to thereby load the compressor.

In addition, upon the release of fluid under pressure from the chamber 94, fluid is released from the chamber 113 of the lubricant supply means 110 and the piston 112 thereof is moved by the spring 119 until the projection 117 on the piston engages a wall of the chamber 113 to prevent further movement of the piston.

On this movement of the piston 112 there is an increase in the volume of the chamber 118 and lubricant is drawn into this chamber from the reservoir 100 through the passage 120 past the ball check valve 122.

On the occurrence of a condition to which the control device 66 is adapted to respond to effect unloading of the compressor this device operates, as described in detail above, to cut off communication between the chamber 94 and the atmosphere, and to open communication from the passage 75 to the chamber 94 so that fluid under pressure flows from the reservoir 40 to the pipe 64 leading to the compressor unloading means 52 to effect unloading of the compressor, while fluid under pressure supplied to the pipe 64 flows therefrom by way of the pipe 114 to the chamber 113 of the lubricant supply means 110.

On an increase in the pressure of the fluid in the chamber 113, the piston 112 is moved to the left, as viewed in the drawing, against the spring 119 until the seat 116 thereon engages the seat 115 on the body 111 to prevent the escape of fluid from the chamber 113. On this movement of the piston 112 force is exerted upon the lubricant contained in the chamber 118, and lubricant flows from this chamber past the ball check valve 130 to the chamber 124, and thence by way of the pipe 126 to the compressor crankcase chamber 5 to increase the supply of lubricant in the crankcase chamber. On this movement of the piston 112, the ball check valve 122 prevents back flow of lubricant from the chamber 118 to the passage 120 leading to the reservoir 100.

On the occurrence of a condition to which the control device 66 is adapted to respond to effect loading of the compressor, this device operates to cut off the supply of fluid from the reservoir 40 to the pipe 64, and to release fluid from this pipe.

On the release of fluid under pressure from the pipe 64 fluid is released from the compressor unloading means 52 and this means operates, as described in detail above, to again effect loading of the compressor. In addition, upon the release of fluid under pressure from the pipe 64 fluid is released from the chamber 113 of the lubricant supply means 110, and on a reduction in the pressure of the fluid in the chamber 113, the piston 112 is again moved to the right, as viewed in the drawing, by the spring 119 until the projection 117 on the piston engages the wall of the chamber 113.

On this movement of the piston 112 there is a reduction in the pressure on the lubricant contained in the chamber 118. At this time the ball check valve 130 is moved to the seated position to prevent back flow of lubricant from the chamber 124 to the chamber 118, and on a reduction in the pressure on the lubricant in the chamber 118 lubricant is drawn into this chamber past the ball check valve 122 from the reservoir 100 through the passage 120, and the supply means 110 is again conditioned to supply a predetermined amount of lubricant from the reservoir 100 to the crankcase chamber 5 of the compressor 1 upon subsequent operation of the control device 66 to effect unloading of the compressor 1.

This cycle of operation of the lubricant supply means 110 is repeated upon each operation of the control device 66 to unload and load the compressor 1.

The piston 112 of the lubricant supply means 110 is proportioned so that the quantity of lubricant supplied by it to the compressor crankcase chamber 5 on each stroke of the piston is somewhat greater than is required to replace the lubricant consumed by the compressor during the usual or normal time intervals between operations of the control device 66 to unload the compressor.

As a result of the oversupply of lubricant to the crankcase chamber, the lubricant therein will be increased to a level above that which it is desired to maintain in the compressor crankcase chamber. On this oversupply of lubricant to the crankcase chamber, excess lubricant will flow by gravity from the crankcase chamber 5 by way of the pipe 104 to the reservoir 100 to reduce the lubricant in the crankcase chamber to the desired level.

The lubricant supplied from the reservoir 100 to the crankcase chamber is relatively cool because of having been in the reservoir, while the lubricant which flows from the crankcase chamber to the reservoir is relatively hot because of its contact with the portions of the compressor which become heated during operation of the compressor. As some of the heated lubricant in the compressor crankcase chamber is periodically replaced by cool lubricant, the lubricant in the crankcase chamber will be maintained at a somewhat lower temperature than would be the case if cool lubricant were not supplied thereto, or if only sufficient lubricant were supplied to this chamber to replace that consumed during operation of the compressor.

The lubricant supplied from the crankcase chamber to the reservoir 100 will contain some dirt or foreign material which will settle out of the lubricant in the reservoir 100 and collect on the bottom of this reservoir. The passage 120 leading from the reservoir 100 to the lubricant supply means 110 communicates with the reservoir 100 at a point somewhat above the lower wall thereof so that any dirt which collects in the bottom of the reservoir 100 will not reach the passage 120 and interfere with the flow of lubricant to the lubricant supply means 110, or be supplied along with lubricant to the crankcase chamber 5. This arrangement, therefore, serves to insure that the lubricant supply means will not be rendered inoperative, and it also serves to reduce the injurious foreign matter present in the lubricant in the crankcase chamber 5.

It will be seen that my invention provides means to automatically maintain the lubricant supply in the crankcase chamber of a compressor by utilizing an intermittent or periodically recurring operating condition of the compressor, such as the loading and unloading of the compressor, the speed of the compressor, the operation of the compressor lubricant system, or the pressure of the fluid compressed by the compressor, to control the operation of a pump which supplies lubricant from a supplementary reservoir to the crankcase chamber.

While one embodiment of the improved compressor lubricating system provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In combination, a fluid compressor having a crankcase chamber adapted to contain a quantity of lubricant and having an inlet passage through which fluid to be compressed is drawn from the atmosphere, a communication between said crankcase chamber and said inlet passage, a communication through which fluid may be released from the crankcase chamber to the atmosphere, means to prevent flow of fluid from the atmosphere to the crankcase chamber through said communication, a supplementary lubricant reservoir, a communication through which lubricant may flow from the crankcase chamber to the supplementary lubricant reservoir on a predetermined increase in the level of the lubricant in the crankcase chamber, a communication through which fluid may be released from the upper portion of said reservoir to the atmosphere, and means to prevent flow of fluid from the atmosphere to the reservoir through said communication.

2. The combination with a fluid compressor of a type having a lubricant chamber adapted to contain a quantity of lubricant for lubricating the compressor, unloading means responsive to the pressure of the fluid in a chamber, and means for effecting the supply and release of fluid under pressure to and from said chamber to condition the unloading means to effect loading and unloading of the compressor, of a supplementary lubricant reservoir, and means responsive to the pressure of the fluid in said chamber for supplying lubricant from said supplementary reservoir to said lubricant chamber.

3. The combination with a fluid compressor of a type having a lubricant chamber adapted to contain a quantity of lubricant for lubricating the compressor, unloading means responsive to the pressure of the fluid in a pressure chamber, and means for effecting the supply and release of fluid under pressure to and from said pressure chamber to condition the unloading means to effect loading and unloading of the compressor, of a supplementary lubricant reservoir, means responsive to the pressure of the fluid in said pressure chamber for supplying lubricant from said supplementary reservoir to said lubricant chamber, and a communication through which lubricant flows by gravity from the lubricant chamber to the supplementary reservoir on a predetermined increase in the level of the lubricant in said lubricant chamber.

JOSEPH C. McCUNE.